J. PEIL.
VALVE CONTROLLING DEVICE.
APPLICATION FILED NOV. 25, 1921.
1,436,523. Patented Nov. 21, 1922.
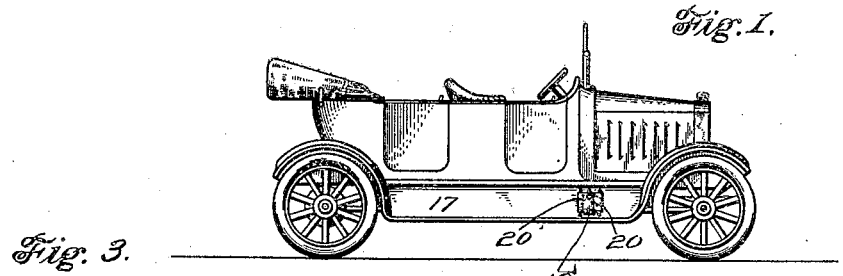
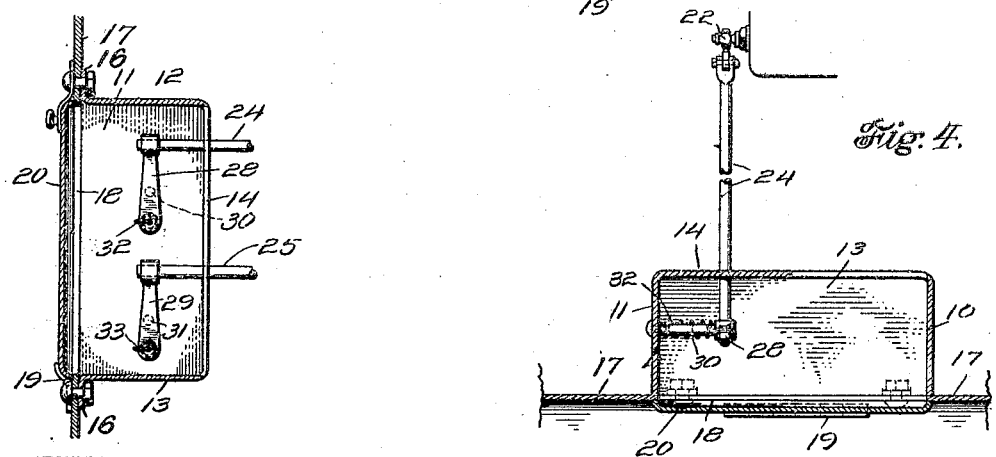
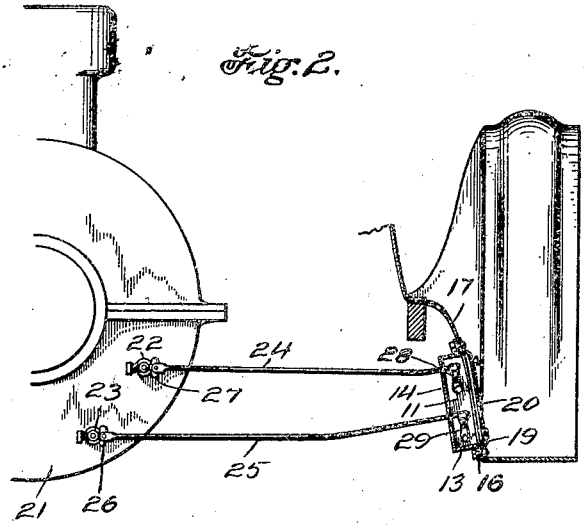
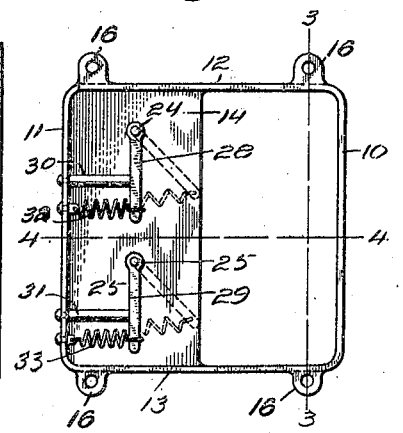
Joseph Peil. INVENTOR.
BY
Geo. P. Kimmel
ATTORNEY.

Patented Nov. 21, 1922.

1,436,523

UNITED STATES PATENT OFFICE.

JOSEPH PEIL, OF BLOOMER, WISCONSIN.

VALVE-CONTROLLING DEVICE.

Application filed November 25, 1921. Serial No. 517,691.

*To all whom it may concern:*

Be it known that I, JOSEPH PEIL, a citizen of the United States, residing at Bloomer, in the county of Chippewa and State of Wisconsin, have invented certain new and useful Improvements in Valve-Controlling Devices, of which the following is a specification.

This invention relates to motors in which the crank case is utilized as an oil reservoir in which the crank shaft and the connecting rods are constantly immersed, and has for one of its objects to provide a simply constructed attachment whereby the chauffeur may determine the stage of oil in the crank case without dismounting or stopping the motor or the movement of the automobile or other vehicle.

Another object of the invention is to provide a device of this character which may be readily adapted to motor driven vehicles of various forms without material structural change in the vehicle or in the improved device.

With these and other objects in view the invention consists in certain novel features of construction as hereinafter shown and described and then specifically pointed out in the claim, and in the drawings illustrative of the preferred embodiment of the invention:—

Figure 1 is a side elevation of a conventional automobile with the improvement applied.

Fig. 2 is a transverse section partly diagrammatic, of a part of the crank case body and apron portion of a conventional automobile with the improvement applied.

Fig. 3 is a vertical sectional view enlarged of the casing for supporting the valve actuating rods and their operating devices.

Fig. 4 is a longitudinal section of the structure disclosed in Fig. 3.

Fig. 5 is a front elevation of the casing detached.

The improved device comprises a supporting casing having an open front, closed ends 10 and 11, closed top and bottom 12 and 13 and partly closed back 14. The casing is formed with attaching ears 16 whereby it may be connected to the inner face of a part of the body of an automobile, preferably the apron portion 17, the latter having a relatively large opening, indicated at 18, over which the casing extends.

Detachably connected at 19 to the apron portion 17 is a closure 20 for the opening 18, as shown.

A portion of the crank casing of the motor is represented at 21 and the pet cocks or valves denoting the stage of oil in the casing at 22 and 23, one below the normal stage of the oil and the other above the normal stage.

Rods 24 and 25 are coupled respectively at 26 and 27 to the stems of the pet cocks 22 and 23, and extend through apertures in the rear half wall 14 of the casing. Attached respectively to the ends of the rods 24 and 25 within the casing are operating levers 28 and 29 whereby the rods may be rotated independently to open the pet cocks.

Extending inwardly from the end 11 of the casing are stop pins 30 and 31 against which the lever arms 28 and 29 bear when in one position to limit the movement in one direction.

Springs 32 and 33 are connected respectively to the lever arms and operate to hold them yieldably in engagement with the pins 30 and 31 and to automatically return the levers to normal position and close the pet cocks when the lever arms are released.

The casing being attached to the inner face of the apron portion 13 of the vehicle, is entirely concealed and presents no obstruction or projection over the running board, the only portion extending beyond the general face of the apron being the relatively thin closure member 20.

With this simple device applied to the vehicle, the chauffeur can easily and readily ascertain the stage of oil in the crank casing by opening the closure 20 and observing the pet cocks 22 and 23 through the relatively large opening in the back wall of the casing, and then manually actuating the levers 28 and 29 to open one or both of the pet cocks.

The preferred embodiment of the invention is disclosed in the drawings set forth in the specification, but it will be understood that modifications within the scope of the claimed invention may be made in the construction without departing from the principle of the invention or sacrificing any of its advantages.

Having fully described the invention, what is claimed as new is:—

The combination with the apron portion of a motor driven vehicle having an opening therethrough, of a casing attached to the inner face of the apron and communicating with the opening, said casing having an open front and a relatively large opening in the back wall through which the crank casing pet cocks are visible, rods extending through the rear wall of said casing and adapted to be coupled respectively to the crank casing pet cocks, a crank arm attached to each of said rods within the casing, and a yieldable means attached to each of said crank arms and operating to hold said pet cocks normally closed.

In testimony whereof, I affix my signature hereto.

JOSEPH PEIL.